ABSTRACT OF THE DISCLOSURE

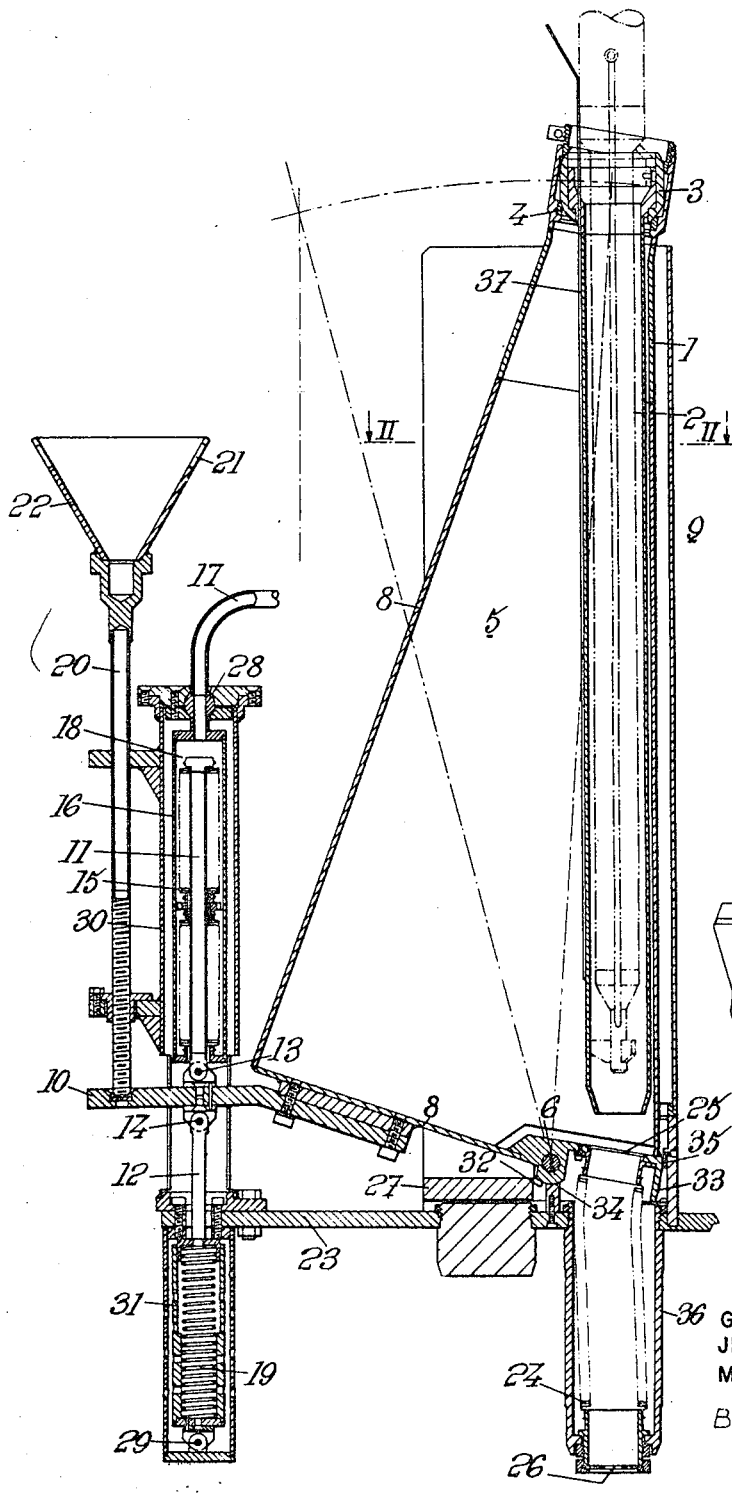
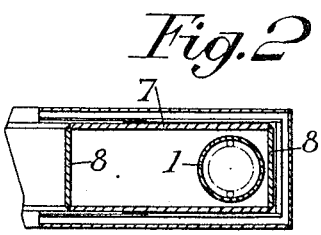
Fig.1.
Fig.2.
INVENTORS,
GERARD DUPUY,
JEAN JAVELLAUD,
MARC ROBIN
ATTORNEY 3,454,465
DEVICES FOR HOLDING A SAMPLE TO BE
IRRADIATED IN A NUCLEAR REACTOR
Jean Javellaud, Chilly-Marazin, and Marc Robin and Gerard Dupuy, Paris, France, assignors to Commissariat à l'Energie Atomique, Paris, France, a French organisation
Filed May 8, 1967, Ser. No. 636,885
Claims priority, application France, May 23, 1966, 62,591
Int. Cl. G21g 1/02; B01j 1/10
U.S. Cl. 176—15        6 Claims

The invention is concerned with a device for holding a sample to be irradiated in a nuclear reactor containing a liquid moderator. The vertical tubular container in which the sample is placed is hanging in a ball and socket joint from the top part of a prismatic water box mounted pivotally at the lower part thereof about a horizontal axis. By vertical displacements imparted to a horizontal strap fixed to said box, the latter can be pivoted about said last mentioned axis, which adjusts the horizontal distance between the tubular container and the core of the reactor while maintaining said container in vertical position.

---

The present invention relates to devices for holding samples to be irradiated in experimental nuclear reactors and in particular in nuclear reactors having a liquid moderator, such as swimming pool reactors, said devices including a vertical tubular container, hereinafter called "bag," itself housed in an envelope filled with said moderator and called "water box."

The chief object of the present invention is to provide a device of this kind which is better adapted to meet the requirements of practice than those used up to this time, in particular in that it permits of adjusting in a continuous manner and very easily the horizontal distance between the sample container and the reactor core.

The essential feature of this invention consists in pivoting the water box of such a device about a lower horizontal axis, in hanging the bag in this box pivotally about at least one second axis parallel to the preceding one and located in the upper portion of the box and in providing means, preferably hydropneumatic means, for controlling from a distance the pivoting displacements of the box about said first axis, which produce practically horizontal displacements of said second axis and therefore of the bag mounted about said second axis.

It is known that, in experimental reactors such as swimming pool reactors, housings are provided to receive the samples the behavior of which under the effect of irradiation is to be studied.

Such housing are in particular in the form of vertical tubes or "bags" immersed in prismatic envelopes filled with water and called water boxes, generally disposed at the periphery of the core of the reactor.

In known constructions, these bags, and possibly the boxes that contain them, were displaceable vertically for adjusting the power of the irradiation applied to the samples. This involved delicate problems of distribution of the irradiation of said samples, especially with samples of elongated shape. As a matter of fact it may be considered that the surfaces corresponding to identical neutronic powers are approximately spheres having their centers at the center of the core, so that if a vertically elongated sample extending along one side of the core is moved upwardly, its upper portions are subjected to a neutron flux much lower than that acting upon the other portions.

The present invention permits, on the contrary, of simultaneously modifying in substantially the same manner the neutron fluxes applied to the different portions of an elongated sample disposed as above stated, and this owing to horizontal displacements of the bag.

Such displacements require particularly small forces due to the swinging arrangement of the water box in the vicinity of its neutral position, the vertical direction of the bag being automatically maintained by the fact that said bag is hanging about an axis parallel to the pivot axis of this box.

A preferred embodiment of the present invention will be hereinafter described with reference to the appended drawings given merely by way of example and in which:

FIG. 1 is a vertical sectional view of a device according to the present invention, and FIG. 2 is a horizontal sectional view on the line II—II of FIG. 1.

The vertical tubular bag containing the sample to be irradiated is designated by reference numeral 1, the sample being for instance a nuclear fuel rod 2.

This bag 1 is provided at its upper end with a spherical ball 3 fitting slidably in a spherical socket 4 located at the upper part of water box 5.

Water box 5 is pivotally mounted, at the bottom thereof, about a horizontal axis 6. The general shape of water box 5 is that of a prism having horizontal edges extending between two bases 7 parallel to each other in vertical respective planes and of identical respective shapes, each of said bases 7 being a quadrilateral two sides of which make with each other an obtuse angle having its apex on axis 6 whereas the two other sides of the quadrilateral make with each other an acute angle, the apex of which is near the ball and socket joint 3–4 about which bag 1 is hanging from the top of box 5.

On this box 5 there is secured a horizontal strap 10, located on the side opposed to the core 9 of the reactor. The vertical displacements of said strap 10 cause box 5 to pivot about axis 6 and therefore to impart translatory horizontal displacements to bag 1 which remains vertical.

Strap 10 may be moved through purely mechanical means.

But as said element 10 must be operated from a distance, through a layer of several meters of water, it is preferable to control the movement of strap 10 through hydropneumatic means, as illustrated by the drawings.

Said control means include:

(a) Two vertical rods 11–12 hinged, at 13 and 14, on strap 10;

(b) Metallic bellows 15 surrounding the upper rod 11, the upper end of said bellows being closed and secured to said rod 11 whereas the lower end is welded to the bottom of a liquidtight cylinder 16 surrounding it;

(c) A pipe 17 opening into the annular liquidtight chamber 18 comprised between bellows 15 and cylinder 16;

(d) A return spring 19 bearing upon the bottom end of the lower rod 12 so as to urge said rod, and therefore strap 10, in the upward direction; and (e) Means (not shown by the drawing) for adjusting from a distance the pressure of a fluid, such as water, fed to chamber 18 through pipe 17.

With such an arrangement variation of this fluid pressure causes bag 1 to be moved in the horizontal direction so as to adjust the irradiation to which it is subjected.

If this pressure is increased, bellows 15 is compressed, which lowers rod 11 and strap 10 and causes box 5 to pivot about axis 6 toward the left of FIG. 1, thus moving bag 1 away from the reactor core 9.

On the contrary a reduction of this pressure causes displacements of said parts in opposed directions respectively.

The drawings further show the following elements:

An abutment 20 limiting the upward displacements of strap 10, this abutment 20 being adjustable from a distance by screwing by means of a tool engaging notches 21 of a funnel-shaped part 22 rigid with abutment 20;

A fixed abutment 27 to limit the pivoting of box 5 toward the left of FIG. 1;

A grid 23 to support the above mentioned parts including the core of the reactor;

A bellows 24 connecting in a fluidtight manner an orifice 25 of box 5 located under bag 1, when the latter is in the position of FIG. 1, with the lower end 26 of a tube 36 mounted on grid 23 and connected to a suction pump;

Two hinge connections 28 and 29 interposed, the first one between cylinder 16 and a frame 30 rigid with grid 23 and the second one between said frame 30 and a casing 31 surrounding spring 19, in order to improve the flexibility of movement of strap 10;

Two cylindrical bearings 32 and 33 carried by box 5 and both centered on axis 6 on opposite sides of orifice 25, these two bearings cooperating with two complementary cylindrical bearings 34 and 35 of grid 23 so as to improve fluidtightness between the inside and the outside of tube 36 which surrounds bellows 24; and A sleeve 37 extending along bag 1 and through which a gas such as argon is made to flow in order to determine the radioactivity existing in said bag at any time.

The device above described has many advantages over those existing at the present time and in particular it permits:

Of very easily adjusting the intensity of irradiation applied on a given sample practically without modifying the distribution of this intensity over this sample even if it is of vertical elongated shape;

Of very easily withdrawing the bag and the sample it contains into a region where said intensity becomes negligible, and this without stopping the reactor; and Of circulating without difficulty through the bag a suitable fluid, such as cooling water, without risk of substantially mixing this fluid with the liquid that surrounds the box, owing to the fluidtightness ensured by swivel joint 3, 4, by the fluidtight mounting of bellows 24 and, in case of failure of these bellows, by cylindrical bearings 32 to 35.

While the above description discloses a preferred embodiment of the invention, it should be well understood that it is not limited thereto as there might be changes made in the arrangement, disposition and form of the parts as comprehended within the scope of the appended claims.

What we claim is:

1. In a nuclear reactor having a fixed part and containing a liquid moderator, a device for holding a sample to be irradiated which comprises, in combination, immersed in said liquid moderator, a water box filled with said moderator, said water box being pivoted at the bottom thereof about a first horizontal axis to the reactor fixed part, a vertical tubular container for said sample hanging freely from the top part of said water box about at least one second horizontal pivot axis parallel to said first horizontal axis, and means for controlling from a distance pivoting displacements of small amplitude of said water box about said first horizontal axis.

2. A device according to claim 1, including a ball and socket joint for connecting said vertical tubular container with the top part of said water box.

3. A device according to claim 1 further including a strap rigid with the lower part of said water box, said means for controlling pivoting displacements of said water box being arranged to move said strap vertically.

4. A device according to claim 1 wherein said means for controlling displacements of said water box are hydropneumatic means.

5. A device according to claim 3 wherein said means for controlling displacements of said water box comprise a spring urging said strap upwardly, an adjustable abutment carried by the reactor fixed part for limiting the upward displacement of said strap, a deformable bellows for urging said strap downwardly, and means for feeding liquid under pressure into said bellows.

6. A device according to claim 1 wherein said water box is of the general shape of a prism the edges of which are horizontal and the parallel vertical bases of which are in the general shape of quadrilaterals having one apex on the first horizontal axis, with an obtuse apex angle, and the opposite apex near the second horizontal axis, with an acute apex angle.

References Cited

UNITED STATES PATENTS 3,006,834  10/1961  Loeb _____ 176—15

FOREIGN PATENTS 965,887  8/1964  Great Britain.

BENJAMIN R. PADGETT, *Primary Examiner.*

H. E. BEHREND, *Assistant Examiner.*